US007016505B1

(12) United States Patent
Nakadai et al.

(10) Patent No.: US 7,016,505 B1
(45) Date of Patent: Mar. 21, 2006

(54) ROBOT ACOUSTIC DEVICE

(75) Inventors: Kazuhiro Nakadai, Chiba (JP); Hiroshi Okuno, Tokyo (JP); Hiroaki Kitano, Saitama (JP)

(73) Assignee: Japan Science and Technology Agency, Kawaguchi (JP)

( * ) Notice: Subject to any disclaimer, the term of this patent is extended or adjusted under 35 U.S.C. 154(b) by 265 days.

(21) Appl. No.: 10/130,295

(22) PCT Filed: Nov. 1, 2000

(86) PCT No.: PCT/JP00/07697

§ 371 (c)(1),
(2), (4) Date: May 30, 2002

(87) PCT Pub. No.: WO01/39934

PCT Pub. Date: Jun. 7, 2001

(30) Foreign Application Priority Data

Nov. 30, 1999 (JP) ................................ 11/341240

(51) Int. Cl.
*A61F 11/06* (2006.01)
*G10K 11/16* (2006.01)
*H03B 29/00* (2006.01)

(52) U.S. Cl. ...................... 381/71.1; 381/92; 381/94.1; 318/568.12; 901/50; 348/14.08

(58) Field of Classification Search ............... 381/94.1, 381/92, 71.1–74.12, 355, FOR. 147, 313, 381/356; 348/14.08; 318/568.11, 568.12, 318/568.16, 568.22
See application file for complete search history.

(56) References Cited

U.S. PATENT DOCUMENTS 4,932,063 A * 6/1990 Nakamura ................. 381/94.7
5,579,046 A * 11/1996 Mitsuhashi et al. ...... 348/231.4
6,243,471 B1 * 6/2001 Brandstein et al. ........... 381/92
6,639,986 B1 * 10/2003 Kanamori et al. ......... 381/71.1

FOREIGN PATENT DOCUMENTS

JP 2-246599 10/1990

(Continued)

OTHER PUBLICATIONS

Merriam-Webster's Collegiate Dictionary, Tenth Edition, p. 1013.*

(Continued)

*Primary Examiner*—Xu Mei
*Assistant Examiner*—Con P. Tran
(74) *Attorney, Agent, or Firm*—Westerman, Hattori, Daniels & Adrian, LLP

(57) ABSTRACT

The invention is directed to an auditory robot for a human or animal like robot, e.g., a human like robot (10) having a noise generating source such as a driving system in its interior. The apparatus includes a sound insulating cover (14) with which at least a head part (13) of the robot is covered; a pair of outer microphones (16; 16*a* and 16*b*) installed outside of the cover and located at a pair of positions where a pair of ears may be provided spaced apart for the robot, respectively, for collecting an external sound primarily; at least one inner microphone (17; 17*a* and 17*b*) installed inside of the cover for primarily collecting a noise from the noise generating source in the robot interior; and a processing module (18) on the basis of signals from the outer and inner microphones for removing from sound signals from the outer microphones (16*a* and 16*b*), a noise signal from the internal noise generating source. Thus, the robot auditory apparatus of the invention is made capable of effecting active perception by permitting an external sound from a target to be collected unaffected by a noise in the inside of the robot such as from the driving system.

7 Claims, 2 Drawing Sheets

FOREIGN PATENT DOCUMENTS

| | | |
|---|---|---|
| JP | 5-344011 | 12/1993 |
| JP | 9-127982 | 5/1997 |
| JP | 10-99558 | 4/1998 |
| JP | 11-231900 | 8/1999 |

OTHER PUBLICATIONS

Irie; "Robust Sound Localization: An Application of an Auditory Perception System for a Humanoid Robot", Massachusetts Institute of Technology, Jun. 1995.*

* cited by examiner

ROBOT ACOUSTIC DEVICE

FIELD OF THE INVENTION

The present invention relates to an auditory apparatus for robots, in particular a robot of human or animal type.

BACKGROUND ART

In those types of robots, attention has in recent years been riveted to active perception of vision and audition.

In a robot, a perception by a sensor provided for its vision or audition is made active (active perception) when a part of the robot carrying the sensor such as its head part is varied in position or orientation controlled by a driving system so that the sensor follows the movement or instantaneous position of a target to be sensed or perceived.

Studies have diversely been undertaken for active vision, using an arrangement in which at least a camera as the sensor has its optical axis kept directed towards a target as controlled in position by a driving system and while capturing by performing automatic focusing and zooming in and out relative to the target.

For active audition or hearing, at least a microphone as the sensor may have its directivity kept directed towards a target as controlled in position by a driving system to collect a sound from the target. The active audition has been found inconvenient, however, in that while the driving system is actuated, the microphone may come to pick up an motion sound from the driving system and this sound as a relatively loud noise may become mixed with the sound from the target, thereby making it hard to recognize the sound from the target.

Yet, auditory studies performed in the situation that the driving system is at a halt indicate that especially if the target is moving, it is difficult to effect what is called active audition while having the microphone follow the movement of the target.

Yet further, the microphone as the auditory means may come to pick out not only the sound from the driving system but also various motion sounds generated within the robot and noises steadily emitted from its inside.

With these problems taken into account, therefore, it is an object of the present invention to provide an auditory apparatus for a robot which can reliably collect a sound from an external target to effect active perception without being affected by noises produced by interior components of a robot.

DISCLOSURE THE INVENTION

The object mentioned above is achieved in accordance with the present invention by an auditory apparatus having a noise generating source in its interior, which apparatus comprises: a sound insulating cover with which at least a part of the robot is covered; at least one outer microphone installed outside of the said cover for primarily collecting an external sound from a target; at least one inner microphone installed inside of the said cover for primarily collecting a noise from the said noise generating source in the robot interior; a drive means adapted to control orientation of the said outer microphone so its directivity follows the position of the said target generating the external sound; and a processing module on the basis of a signal from the said outer microphone being controlled by the said drive means at least as to its orientation and to a signal from the said inner microphone for removing from sound signals from the said outer microphone being controlled by the said drive means at least as to its orientation, a noise signal from the said internal noise generating source.

The object mentioned above is also achieved in accordance with the present invention by an auditory apparatus for a human or animal type robot having in its interior a noise generating source such as a drive means, characterized in that the apparatus comprises: a sound insulating cover with which at least a head part of the robot is covered; a pair of outer microphones installed outside of the said cover and located at a pair of positions where a pair of ears may be provided spaced apart for the robot, respectively, for primarily collecting an external sound from a target; at least one inner microphone disposed inside of the said cladding for primarily collecting a noise from the said noise generating source in the said robot interior; a said drive means adapted to control orientation of the said outer microphones so their directivity follows the position of the said target generating the external sound; and a processing module on the basis of signals from the said outer microphones being controlled by the said drive means at least as to their orientation and to a signal from the said inner microphone for removing from sound signals from the said outer microphones being controlled by the said drive means at least as to their orientation, a noise signal from the said internal noise generating source.

A robot auditory apparatus of the present invention as mentioned above preferably has a pair of such inner microphones provided located at a pair of positions spaced apart, respectively, as are the said outer microphones.

A robot auditory apparatus of the present invention as mentioned above preferably has the said a pair of inner microphones installed interior of the said cover and at the two spaced apart positions which are in the neighborhoods of the said two outer microphones, respectively.

A robot auditory apparatus of the present invention as mentioned above preferably has the said inner microphones mounted movably in the interior of the said cover.

A robot auditory apparatus of the present invention as mentioned above preferably has the said outer microphones installed and arranged at the said ear positions so they there have their direction of directivity oriented towards their front.

A robot auditory apparatus of the present invention as mentioned above preferably has the said cover in the regions of the said ear positions formed so the said outer microphones there have their direction of directivity oriented towards their front.

The apparatus construction mentioned above permits a said outer microphone(s) to primarily collect an external sound from a target and a said inner microphone to primarily collect a noise from the noise generating source such as the drive means in the inside of the robot. Then, while a sound signal from the outer microphone collecting the external sound may have such a noise signal from the noise generating source in the inside of the robot mixed with the external sound, the noise signal mixed is canceled by a noise signal from the inner microphone collecting the noise and is thereby greatly reduced in level.

Consequently, the sound signal from the outer microphone having the noise component from the noise generating source such as the drive means in the inside of the robot greatly reduced in level will have its Signal-Noise (S/N) ratio largely improved and enable the robot to effect active perception with a greater fineness.

If a pair of such inner microphones are located at a pair of positions spaced apart, respectively, as are the outer microphones, then it is made possible for noise signals contained in the sound signals from the outer microphones to be favorably canceled, respectively, by noise signals from their corresponding inner microphones collecting the noise.

If the two inner microphones are installed interior of the cover and at the two spaced apart positions which are in the neighborhoods of the two outer microphones, respectively, then the collection by each of the inner microphones of a noise like a noise mixed into the sound signal from its corresponding outer microphone makes it possible for a noise signal picked up by each of the outer microphones to be better canceled by a noise signal picked up by its corresponding inner microphone.

If the inner microphones are mounted movably in the interior of the said cover, then it is made possible to move the inner microphones so they can better collect noises from noise generating sources. Thus noises included in sound signals collected by the outer microphones are better canceled.

If the outer microphones are installed and arranged at the robot ear positions so they have their directivity oriented towards their front, especially if the said cover in the regions of the robot ear positions is formed so the outer microphones there have their directivity oriented towards their front. Then the outer microphones are made to act as a binaural microphone collect a sound thereby closer to a sound heard by a human being.

BRIEF OF DESCRIPTION OF THE DRAWINGS

The present invention will better be understood from the following detailed description and the drawings attached hereto showing certain illustrative forms of embodiment of the present invention; in this connection, it should be noted that such forms of embodiment illustrated in the accompanying drawings hereof are intended in no way to limit the present invention but to facilitate an explanation and understanding thereof, in which drawings.

BEST MODES FOR CARRYING OUT THE INVENTION

Hereinafter, an explanation is given in respect of a robot auditory apparatus as a suitable form of embodiment of the present invention, reference being made to FIGS. 1 to 4.

FIGS. 1 to 4 together show an overall makeup of an experimental humanoid including a robot auditory apparatus according to the present invention in one form of embodiment thereof.

Figure 1:
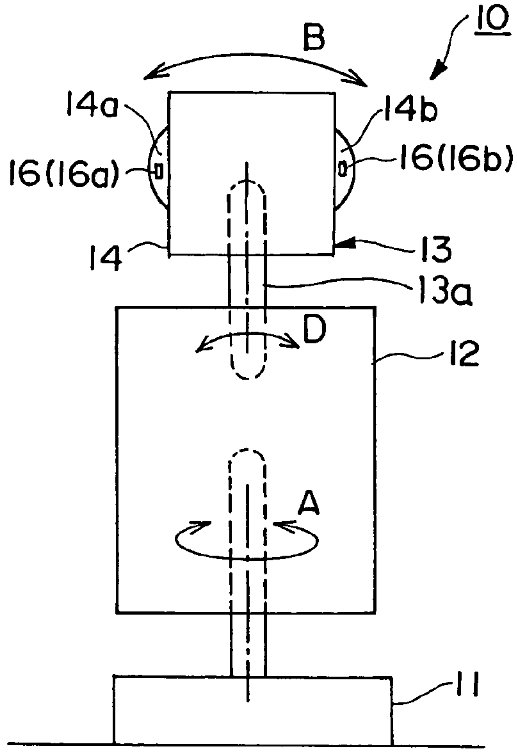
FIG. 1 is a front elevational view illustrating an appearance of a humanoid incorporating a robot auditory apparatus that represents a certain form of embodiment of the present invention.

Referring to FIG. 1, the humanoid indicated by reference character 10 is made up as a robot with four degrees of freedom (4DOFs) and includes a base 11, a body part 12 supported on the base 11 so as to be rotatable uniaxially about a vertical axis, and a head part 13 supported on the body part 12 so as to be capable of swinging triaxially about a vertical axis, a lateral horizontal axis extending from right to left or vice versa and a longitudinal horizontal axis extending from front to rear or vice versa.

The base 11 may either be installed fixed in position or arranged operable as a foot of the robot. Alternatively, the base 11 may be mounted on a movable carriage or the like.

The body part 12 is supported rotatably relative to the base 11 so as to turn about the vertical axis as indicated by the arrow A in FIG. 1. It is rotationally driven by a drive means not shown and is covered with a sound insulating cover in the form of embodiment illustrated.

Figure 2:
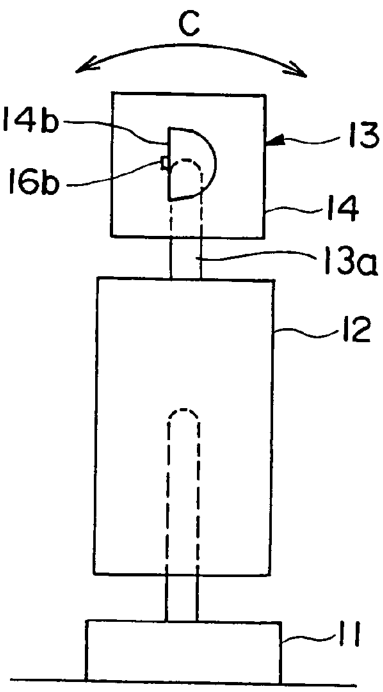
FIG. 2 is a side elevational view of the humanoid shown in FIG. 1.

The head part 13 is supported from the body part 12 by means of a connecting member 13*a* and is made capable of swinging relative to the connecting member 13*a*, about the longitudinal horizontal axis as indicated by the arrow B and about the lateral horizontal axis as indicated by the arrow C in FIG. 2. And, as carried by the connecting means, it is further made capable of swinging relative to the body part 12 as indicated by the arrow D about another longitudinal axis extending from front to rear or vice versa. Each of these rotational swinging motions A, B, C, and D for the head part 13 is effected using a respective driving system not shown.

Figure 3:
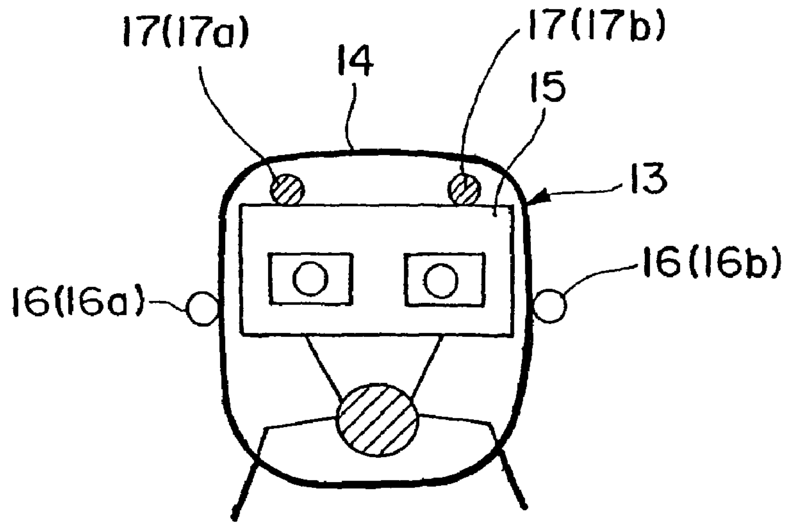
FIG. 3 is an enlarged view diagrammatically illustrating a makeup of the head part of the humanoid shown in FIG. 1.

Here, the head part 13 as shown in FIG. 3 is covered over its entire area with a sound insulating cover 14 and at the same time is provided at its front side with a camera 15 as the visual means in charge of robot's vision and at its both sides with a pair of outer microphones 16 (16*a* and 16*b*) as the auditory means in charge of robot's audition or hearing.

Further, as shown in FIG. 3 the head part 13 includes a pair of inner microphones 17 (17*a* and 17*b*) installed interior of the cover 14 and spaced apart at right and left.

The cover 14 is composed of a sound absorbing synthetic resin such as, for example, urethane resin, and by covering the inside of the head part 13 substantially practically to the full therewith is designed to insulate and shield sounds within the head part 13.

It should also be noted that the body part 12 may likewise be covered with a cover that is similarly composed of a sound absorbing synthetic resign.

The camera 15 may be of a known makeup and a commercially available camera having panning, tilting and zooming functions can here be applied thereto.

The outer microphones 16 are attached to the head part 13 so that in its side faces they have a directivity towards its front.

Here, the right and left hand side microphones 16*a* and 16*b* as the outer microphone 16 as will be apparent from FIGS. 1 and 2 are mounted inside of, and thereby received in, stepped bulge protuberances 14*a* and 14*b*, respectively, of the cover 14 with their stepped faces having one or more openings and facing to the front at its both sides and are thus arranged to collect though these openings a sound arriving from the front. And, at the same time, they are suitably insulated from sounds interior of the cover 14 so as not to pick up such sounds.

This makes up the outer microphones 16*a* and 16*b* as what is called a binaural microphone. It should be noted further that the cover 14 in the areas where the outer microphones 16*a* and 16*b* are mounted may be formed so as to resemble human outer ears.

The inner microphones 17 are located interior of the cover 14 and yet in the neighborhoods of the outer microphones 16*a* and 16*b*, respectively, and in the form of embodiment illustrated, above the opposed ends of the camera 15, respectively.

This, however, does note exclude the possibility that the inner microphone 17 may be located anywhere as desired in the inside of the cover 14.

Figure 4:
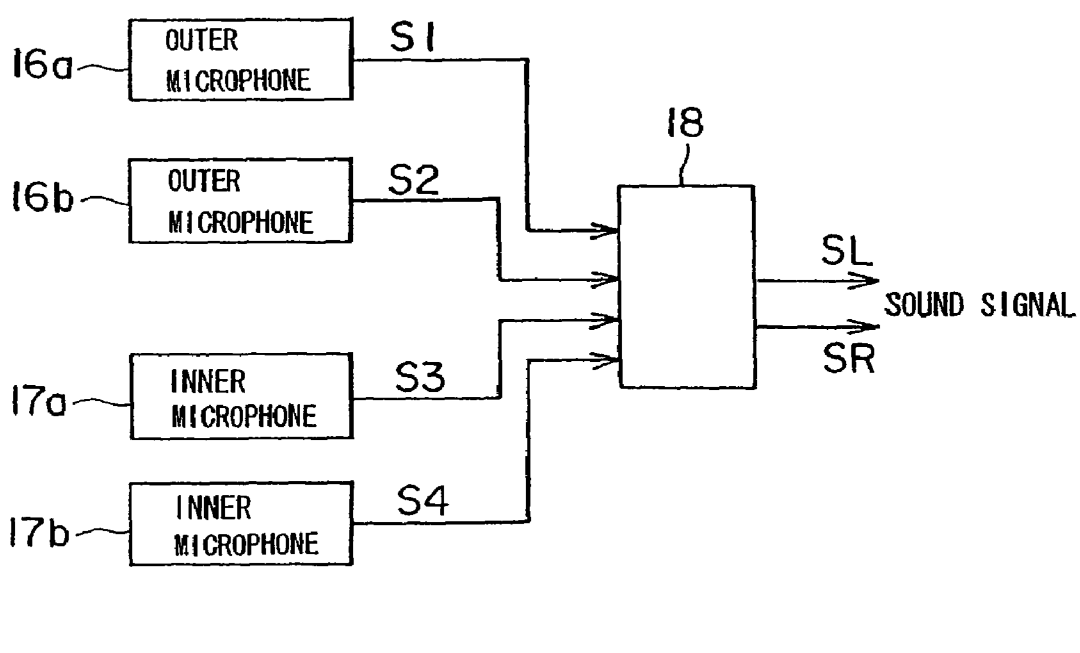
FIG. 4 is a block diagram illustrating an electrical makeup of the robot auditory apparatus of the humanoid robot shown in FIG. 1.

FIG. 4 shows an electrical makeup including the outer microphone 16 and the inner microphone 17 for sound processing.

Referring to FIG. 4, respective sound signals S1, S2, S3 and S4 from the outer microphones 16*a* and 16*b* and the inner microphones 17*a* and 17*b* are entered into a processing module 18. The processing module 18 is designed to rectify the sound signals received from the outer microphones 16*a* and 16*b* on the basis of noise signals from noise sources generated inside of the robot which are collected by the inner microphones 17*a* and 17*b*. For example, the processing module 18 in a most convenient way effects noise cancellation processing by way of a suitable computing processing such as by subtracting from the sound signals from the outer microphones 16*a* and 16*b* the sound signals adjusted in level from the sound signals from the inner microphones 17*a* and 17*b*, thereby eliminating noises from the noise generating sources such as various driving systems within the robot which are mixed into the sound signals S1 and S2.

The humanoid 10 according to the illustrated form of embodiment of the present invention is constructed as mentioned above, whereby noises are cancelled as mentioned below from a target sound from the outer microphones 16*a* and 16*b* which is sought to be collected.

To begin with, the outer microphones 16*a* and 16*b* act to primarily collect a sound from the target in the environment to issue sound signals S1 and S2. Here, while noises from the inside of the robot are likely collected by the outer microphones 16*a* and 16*b* and mixed with the target sound, the mixed noises are restrained to a relatively low level by virtue of the fact that the cover 14 itself shuts the inside of the head part 13 tightly and insulates the outer microphones 16*a* and 16*b* from sounds produced inside of the head part 13.

In contrast, the inner microphones 17*a* and 17*b* serve to primarily collect noises inside of the robot, namely noises from noise generating sources as mentioned previously, e.g., motion sounds from each of driving system and those from a cooling fan. Here, while the inner microphones 17*a* and 17*b* possibly collects the external sound, the cover 14 sealing its interior acts to restrain the collected external sound to a relatively low level.

The sound signals S1, S2, S3 and S4 of the thus collected sounds from the outer microphones 16*a* and 16*b* and the inner microphones 17*a* and 17*b* each enter into the processing module 18. The processing module 18 by suitably processing the sound signals S1 and S2 from the outer microphones 16*a* and 16*b* and the sound signals S3 and S4 from the inner microphones 17*a* and 17*b* removes from the sound signals S1 and S2 received from the outer microphones 16*a* and 16*b*, the noises signals from noise generating sources in the inside of the robot to provide at its output sound signals SL and SR which are suppressed the noises.

This permits a control (not shown) to make a sound recognition on the basis of these output sound signals SR and SL and thereby to effect active perception.

Thus, by having the processing module 18 effect noise cancellation from the sound signals S1 and S2 from the outer microphones 16*a* and 16*b* on the basis of the sound signals from the inner microphones 17*a* and 17*b*, the humanoid 10 according to the illustrated form of embodiment of the present invention is made capable of obtaining a sound signal of excellent S/N ratio while having the respective driving systems or means operated to keep the outer microphones 16*a* and 16*b* as to their directivity oriented towards the target, thereby effecting sound recognition with an increased accuracy. Consequently, if the target is moving, simply operating the drive means so the directivity of the outer microphones 16*a* and 16*b* follows the instantaneous position of the target allows the robot to make auditory recognition of the target.

While in the form of embodiment illustrated above the humanoid is shown as constructed as having four degrees of freedom (DOFs), this is not intended to be a limitation but the robot auditory apparatus according to the present invention may be included in a robot made operable in any manner as desired.

While in the form of embodiment illustrated above the robot auditory apparatus according to the present invention is shown as included in a humanoid, this is not intended to be a limitation but the robot auditory apparatus according to the present invention may be included in a robot of animal type such as a dog like robot or a robot of any other form.

While in the form of embodiment illustrated above the inner microphones 17 are shown as made up of a pair of microphones 17*a* and 17*b*, the same may consist of only a microphone or a plurality of microphones provided for a like plurality of noise generating sources, respectively.

While in the form of embodiment illustrated above the outer microphones 16 are shown as made up of a pair of microphones 16*a* and 16*b*, the same may consist of a single microphone, or three or more microphones.

Although the present invention has hereinbefore been set forth with respect to certain illustrative forms of embodiment thereof, it will readily be appreciated to be obvious to a person skilled in the art that many alternations thereof, omissions therefrom and additions thereto can be made without departing from the essences and scope of the present invention. Accordingly, it should be understood that the invention is not intended to be limited to the specific forms of embodiment thereof set forth below, but to include all possible forms of embodiment thereof that can be made within the scope with respect to the features specifically set forth in the appended claims and encompasses all the equivalents thereof.

INDUSTRIAL APPLICABILITY

As will be appreciated from the foregoing description, the present invention provides an auditory apparatus for a robot, which enables the robot to hear a sound from a target while being unaffected by noises as generated in the inside of the robot such as from driving systems, thereby effecting active perception, and thus is useful as an excellent robot auditory apparatus.

What is claimed is:

1. An auditory apparatus for a robot having a noise generating source in its interior, characterized in that it comprises:

a sound insulating cover with which at least a part of the robot is covered;

at least one outer microphone installed outside of said cover for primarily collecting an external sound from a target;

at least one inner microphone installed inside of said cover for primarily collecting a noise from said noise generating source in the robot interior;

a drive means adapted to control orientation of said outer microphone so its directivity follows the position of said target generating the external sound; and a processing module for removing from a sound signal from said outer microphone, a noise signal from said internal noise generating source on the basis of said sound signal from said outer microphone being controlled by said drive means at least to its orientation and said noise signal from said inner microphone, and wherein said outer microphone being controlled by said drive means at least to its orientation.

2. An auditory apparatus for a human or animal type robot having in its interior a noise generating source such as a drive means, characterized in that the apparatus comprises:

a sound insulating cover with which at least a head part of the robot is covered;

a pair of outer microphones installed outside of said cover and located at a pair of positions where a pair of ears may be provided spaced apart for the robot, respectively, for primarily collecting an external sound from a target;

at least one inner microphone installed inside of said cover for primarily collecting a noise from said noise generating source in said robot interior;

said drive means adapted to control orientation of said outer microphones so their directivity follows the position of said target generating the external sound; and a processing module for removing from a sound signal from said outer microphone, a noise signal from said internal noise generating source on the basis of said sound signal from said outer microphone being controlled by said drive means at least to its orientation and said noise signal from said inner microphone, and wherein said outer microphone being controlled by said drive means at least to its orientation.

3. A robot auditory apparatus as set forth in claim 2, characterized in that a pair of such inner microphones are provided located at a pair of positions spaced apart, respectively, as are said outer microphones.

4. A robot auditory apparatus as set forth in claim 3, characterized in that said two inner microphones are installed interior of said cover and at the two spaced apart positions which are in the neighborhoods of said two outer microphones, respectively.

5. A robot auditory apparatus as set forth in claim 3, characterized in that said inner microphones are mounted movably in the interior of said cover.

6. A robot auditory apparatus as set forth in any one of claims 1 to 5, characterized in that said outer microphones are installed and arranged at said ear positions so they there have their direction of directivity oriented towards their front.

7. A robot auditory apparatus as set forth in claim 6, characterized in that said cover in the regions of said ear positions is formed so said outer microphones there have their direction of directivity oriented towards their front.

* * * * *